US010782670B2

(12) United States Patent
Crivella et al.

(10) Patent No.: US 10,782,670 B2
(45) Date of Patent: Sep. 22, 2020

(54) ROBOTIC TASK SYSTEM

(71) Applicant: The Boeing Company, Chicago, IL (US)

(72) Inventors: Michelle Crivella, Charleston, SC (US); Philip L. Freeman, Summerville, SC (US); Joshua D. Kalin, Huntsville, AL (US); Robert Stephen Strong, Everett, WA (US); Patrick Joel Michaels, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 15/378,623

(22) Filed: Dec. 14, 2016

(65) Prior Publication Data

US 2018/0164775 A1 Jun. 14, 2018

(51) Int. Cl.
    *G05B 19/402* (2006.01)
    *B25J 9/16* (2006.01)

(52) U.S. Cl.
CPC .......... *G05B 19/402* (2013.01); *B25J 9/1661* (2013.01); *B25J 9/1664* (2013.01); *B25J 9/1666* (2013.01); *B25J 9/1671* (2013.01); *B25J 9/1687* (2013.01); *G05B 2219/39083* (2013.01); *G05B 2219/39135* (2013.01)

(58) Field of Classification Search
CPC .... G05B 19/402; G05B 19/19; G05B 19/182; B23B 47/287; B25J 9/1661; B25J 9/1664; B25J 6/1687; B25J 9/1666; B25J 15/0052; B25J 5/007; B25J 5/04; Y10T 408/03; Y10S 901/01; Y10S 901/41; Y10S 901/44; G05D 1/0274; G05D 1/0295; G05D 1/0225; G05D 1/0234; G05D 1/0246; G05D 1/0251
USPC .............. 700/245, 160, 250; 701/23
See application file for complete search history.

(56) References Cited

U.S. PATENT DOCUMENTS

| | | | | |
|---|---|---|---|---|
| 2003/0208302 A1* | 11/2003 | Lemelson | .............. | G05B 19/19 |
| | | | | 700/245 |
| 2004/0254677 A1* | 12/2004 | Brogardh | ............... | B23K 26/04 |
| | | | | 700/245 |
| 2010/0241248 A1 | 9/2010 | Zhang et al. | | |

(Continued)

OTHER PUBLICATIONS

Rubinovitz et al., "RALB—A Heuristic Algorithm for Design and Balancing of Robotic Assembly Lines," Annals of the CIRP, vol. 42, No. 1, Jan. 7, 1993, pp. 497-500.

(Continued)

*Primary Examiner* — Mouloucoulaye Inoussa
(74) *Attorney, Agent, or Firm* — Yee & Associates, P.C.

(57) ABSTRACT

A method for implementing machining tasks for an object. The method identifies location coordinates for a plurality of holes. A task file contains the machining tasks. The robotic devices use the task files to perform the machining tasks. A minimum number of positioning stations is determined where a portion of the machining tasks will be performed by the robotic devices. An ordered sequence for performing the machining tasks is calculated and path a path with the near-minimum distance is determined. Robotic control files are created that cause the robotic devices to perform the machining tasks. The robotic control files are output to the robotic devices to perform the machining tasks to form the plurality of holes.

20 Claims, 14 Drawing Sheets

(56) References Cited

U.S. PATENT DOCUMENTS

2015/0266147 A1* 9/2015 Reid .................. B23P 21/004
29/525.01
2015/0307211 A1 10/2015 Oberoi et al.
2016/0282855 A1 9/2016 Zhang et al.

OTHER PUBLICATIONS

Extended European Search Report, dated May 15, 2018, regarding Application No. 17196632.8, 6 pages.
Alatartsev et al., "Robotic Task Sequencing Problem: A Survey," Journal of Intelligent and Robotic Systems, Mar. 2015, 19 pages, retrieved on Jun. 24, 2016.
Alatartsev et al., "On Optimizing a Sequence of Robotic Tasks," IEEE International Conference on Intelligent Robots and Systems, 2013, 7 pages.
Gombolay et al., "Fast Scheduling of Multi-Robot Teams with Temporospatial Constraints," Proceedings of Robotics: Science and Systems, Jun. 2013, 8 pages.

* cited by examiner

ROBOTIC TASK SYSTEM

BACKGROUND INFORMATION

1. Field

The present disclosure relates generally to manufacturing objects and, in particular, to manufacturing aircraft. Still more particularly, the present disclosure relates to a method and apparatus for performing manufacturing tasks using robotic devices in a robotic task system.

2. Background

Manufacturing an object, such as an aircraft, involves performing manufacturing tasks on thousands or millions of parts. These manufacturing tasks include drilling holes, installing fasteners, machining surfaces, installing wiring harnesses, inspections, and other types of manufacturing tasks performed to manufacture an aircraft.

In assembling parts to form an aircraft, manufacturing tasks include forming holes within parts for the aircraft. The manufacturing tasks also include installing fasteners within holes. These types of manufacturing tasks may be performed using robotic devices that are programmed to perform these different manufacturing tasks.

In programming a robotic device, a programmer creates a file that is used to command the robotic device to perform the manufacturing tasks. The file includes information that provides instructions for joint movement and operation of a tool on the robotic device to perform the manufacturing tasks. The joint movement moves the tool for the robotic device along a path to perform manufacturing tasks at different locations on the parts for the aircraft.

The current process for creating the file is a time-consuming process. Further, the instructions may not be as efficient as desired. For example, the programmer may not know all of the manufacturing tasks that may be performed from a positioning station in which the robotic device operates. As a result, the program may include additional positioning stations that increase the amount of time required to perform the manufacturing tasks.

Further, other factors such as constraints with respect to the manner in which manufacturing operations may be performed, also may lead to reworking the program. This situation often leads to additional time for programming the robotic device to perform the manufacturing tasks. For example, one-up-assembly provides rules for manufacturing objects, such as aircraft. Taking into account these types of rules also increases the amount of time needed to program the robotic devices.

Therefore, it would be desirable to have a method and apparatus that take into account at least some of the issues discussed above, as well as other possible issues. For example, it would be desirable to have a method and apparatus that overcome a technical problem with programming robotic devices to perform manufacturing operations more efficiently while reducing the amount of time needed to program the robotic devices.

SUMMARY

An embodiment of the present disclosure provides a method for implementing machining tasks for an object. The method comprises identifying the information describing location coordinates for a plurality of holes. The information is identified from a three-dimensional model of the object. The method creates a task file containing the machining tasks using the information, including the location coordinates for each respective hole in the plurality of holes. The method identifies one or more robotic devices using the task file to perform the machining tasks. The method determines a minimum number of positioning stations at which at least one robotic device is positioned to perform the machining tasks. A portion of the machining tasks are performed at each of the minimum number of positioning stations. The method determines the minimum number of positioning stations by identifying from a plurality of potential positioning stations the positioning stations with a maximum number of machining tasks at task locations reachable by the robotic devices, where a sub-set of machining tasks are performed at each positioning station. The method determines an ordered sequence in which to perform the sub-set of machining tasks at each positioning station by iteratively calculating a distance across a span of the task locations to determine a path having a near-minimum distance. The method creates one or more paths for the robotic devices to perform the sub-set of machining tasks at each positioning station. The method creates one or more robotic control files that causes the robotic devices to perform the machining tasks at the minimum number of positioning stations. One or more of the robotic control files are output to one or more of the robotic devices enabling the robotic devices to perform the machining tasks to form the plurality of holes.

Another embodiment of the present disclosure provides a manufacturing system. The manufacturing system comprises a computer system and a task planner, running on the computer system. The task planner identifies information describing the location coordinates for a plurality of holes. The information is identified from a three-dimensional model of an object. The task planner creates a task file containing the machining tasks using the information. The machining task includes the location coordinates for each respective hole in the plurality of holes. The task planner identifies the robotic devices using the task file to perform the machining tasks. The task planner determines the minimum number of positioning stations at which at least one robotic device is positioned to perform the machining tasks in which a portion of the machining tasks are performed. The minimum number of positioning stations is determined by identifying from a plurality of potential positioning stations the stations with a maximum number of the machining tasks at the task locations reachable by the robotic devices. The sub-set of machining tasks is performed at each positioning station. The task planner determines an ordered sequence in which to perform each sub-set of machining tasks at each positioning station by iteratively calculating a distance across a span of the task locations to determine a path having a near-minimum distance. A path planner creates one or more paths for the robotic devices to perform the sub-set of machining tasks at each positioning station using the ordered sequence. A robotic device controller, running on the computer system, creates robotic control files that cause one or more of the robotic devices to perform the machining tasks and the minimum number of positioning stations. The robotic control files are output to the robotic devices enabling the robotic devices to perform the machining tasks to form the plurality of holes.

Yet another embodiment of the present disclosure provides a product management system. The product management system comprises manufacturing equipment, including robotic devices, and a control system. The control system controls the operation of the manufacturing equipment. The control system identifies information describing location coordinates for a plurality of holes. The information is identified from a three-dimensional model of the object. The control system creates a task file containing the machining tasks using the information, including the location coordinates for each respective hole in the plurality of holes. The control system identifies one or more robotic devices using the task file to perform the machining tasks. The control system determines the minimum number of positioning stations at which at least one robotic device is positioned to perform the machining tasks in which a portion of the machining tasks are performed. The minimum number of positioning stations is determined by identifying from a plurality of potential positioning stations the stations with a maximum number of the machining tasks at the task locations reachable by the robotic devices. The sub-set of machining tasks is performed at each positioning station. The control system determines an ordered sequence in which to perform each sub-set of machining tasks at each positioning station by iteratively calculating a distance across a span of the task locations to determine a path having a near-minimum distance. The control system creates one or more paths for the robotic devices to perform the sub-set of machining tasks at each positioning station using the ordered sequence. The control system creates robotic control files that cause one or more of the robotic devices to perform the machining tasks and the minimum number of positioning stations. The robotic control files are output to the robotic devices enabling the robotic devices to perform the machining tasks to form the plurality of holes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current techniques for controlling robotic devices may not reduce the number robotic devices or the amount of time needed to manufacture an object.

The illustrative embodiments provide a method and apparatus for managing manufacturing tasks for robotic devices. The manufacturing tasks are scheduled in a manner that reduces the time needed to complete these tasks. The scheduling is also performed to avoid collisions between robotic devices and meet scheduling constraints. For example, scheduling constraints may be set out in rules that define the manner in which manufacturing tasks are to be performed.

Figure 1:
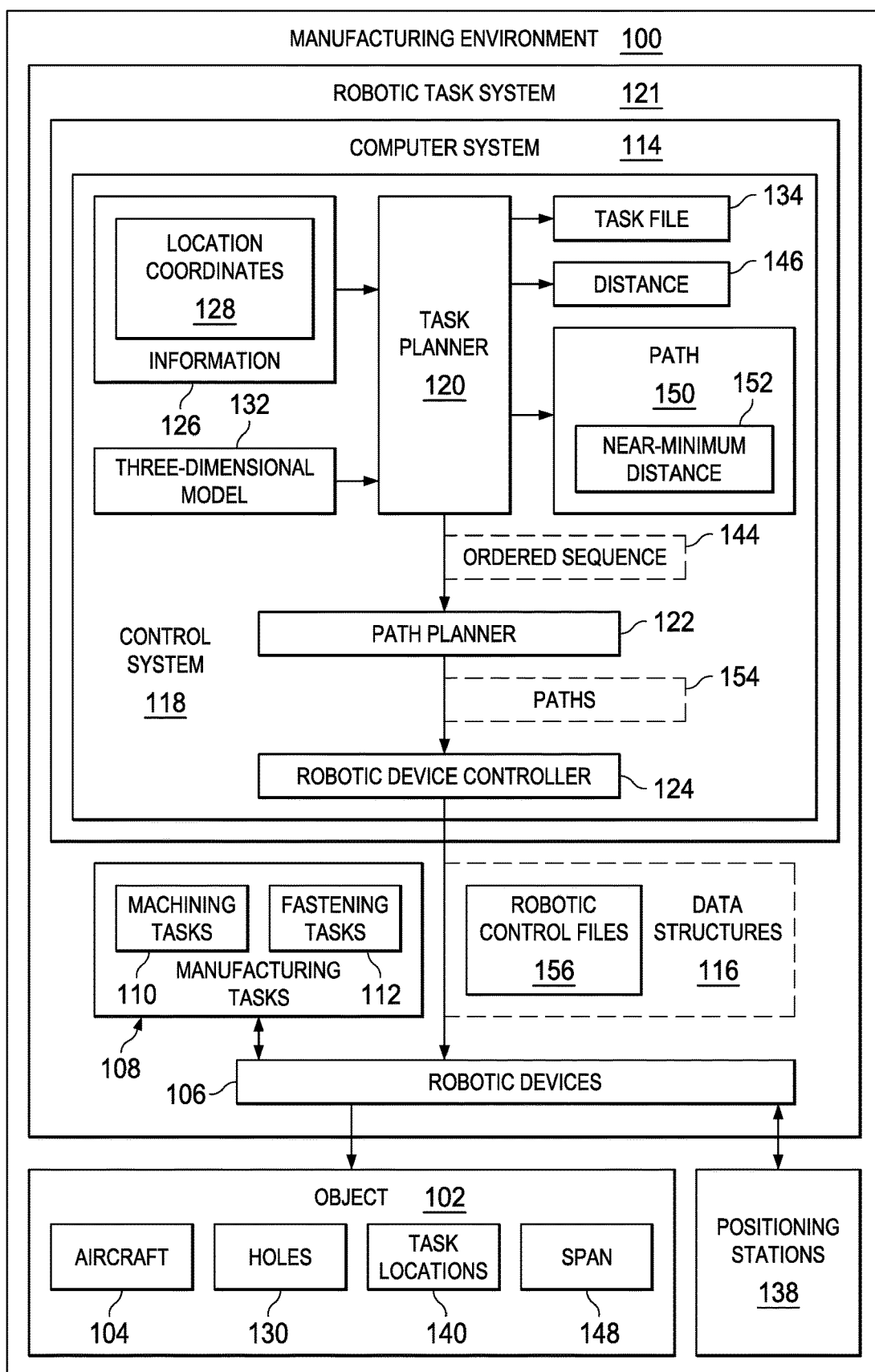
FIG. 1 is an illustration of a manufacturing environment in accordance with an illustrative environment.

With reference now to the figures, in FIG. 1 an illustration of a manufacturing environment is depicted in accordance with an illustrative environment. Manufacturing environment 100 is an example of an environment in which object 102 may be manufactured. In the illustrative example, object 102 takes the form of aircraft 104.

As depicted, robotic devices 106 perform manufacturing tasks 108 for object 102. A robotic device in robotic devices 106 is a physical machine that is configured to perform operations under the control of a processor unit. The robotic device may perform operations using a program that defines the operations to be performed. One or more of these operations form a manufacturing task in manufacturing tasks 108.

As depicted, manufacturing tasks 108 may include one or more different types of tasks used to manufacture object 102. In this illustrative example, manufacturing tasks 108 include at least one of machining tasks 110, fastening tasks 112, or some other suitable type of tasks used to manufacture object 102.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations of items.

As depicted, robotic devices 106 operate under the control of computer system 114. In the illustrative example, computer system 114 creates data structures 116 that are used to control the operation of robotic devices 106 to perform manufacturing tasks 108.

Computer system 114 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable type of data processing system.

In this illustrative example, computer system 114 processes machining tasks 110 for object 102. Computer system 114 includes or implements control system 118. As depicted, control system 118 is a component in computer system 114 that controls the operation of robotic devices 106. In the illustrative example, control system 118 includes task planner 120, path planner 122, and robotic device controller 124.

Task planner 120 in control system 118 identifies information 126 describing location coordinates 128 for a plurality of holes 130. Information 126 is identified from three-dimensional model 132 of object 102 by task planner 120. In this illustrative example, information 126 is selected from at least one of a drill location, a group of dimensions for a hole, a diameter of the hole, a fastener type, a collar type, or some other suitable type of information that may be located in three-dimensional model 132. Three-dimensional model 132 may be a computer-aided design (CAD) model for object 102.

Additionally, task planner 120 creates task file 134 containing machining tasks 110 in manufacturing tasks 108 using information 126. Task file 134 is a plan for performing machining tasks 110 in this example. Each machining task in machining tasks 110 includes location coordinates 128 for each respective hole in the plurality of holes 130. Location coordinates 128 are three-dimensional when describing locations for holes 130.

Further, task planner 120 identifies one or more robotic devices 106 using task file 134 to perform machining tasks 110. Task planner 120 also determines a minimum number of positioning stations 138, at which at least one robotic device in the robotic devices 106 is positioned to perform machining tasks 110, in which a portion of the machining tasks 110 are performed at each of the minimum number of positioning stations 138. The minimum number of positioning stations 138 is determined by identifying from a plurality of potential positioning stations 138 those of the plurality of potential positioning stations 138 with a maximum number of machining tasks 110 at task locations 140 for object 102 reachable by robotic devices 106 in robotic devices 106, where a sub-set of machining tasks 110 are performed at each positioning station in positioning stations 138.

In the illustrative example, task planner 120 also determines ordered sequence 144 in which to perform each sub-set of machining tasks 110 at each positioning station in positioning stations 138. As depicted in this example, ordered sequence 144 is determined by iteratively calculating distance 146 across span 148 of task locations 140 to determine path 150 having near-minimum distance 152. In this example, near-minimum distance 152 is a distance that is within a bound or range for the minimum distance. The bound may be selected based on factors selected from at least one of time to perform machining tasks 110, cost, or other suitable factors.

As depicted, ordered sequence 144 is used by path planner 122 to determine path 150, having near-minimum distance 152. In this illustrative example, path planner 122 creates one or more paths 154 for one or more of robotic devices 106 to perform a sub-set of machining tasks 110 at each positioning station.

As depicted, robotic device controller 124 creates one or more robotic control files 156 that cause one or more of robotic devices 106 to perform machining tasks 110 at the minimum number of positioning stations 138. One or more of robotic control files 156 are output to one or more of robotic devices 106, enabling one or more of robotic devices 106 to perform machining tasks 110 to form the plurality of holes 130.

Further, in the illustrative example, the different operations described in control system 118 may be performed while the manufacturing of object 102 is in progress. In other words, new robotic control files may be created during manufacturing of object 102 to take into account changes that may occur. For example, task planner 120 may continue to identify the most efficient manner in which manufacturing tasks 108 may be performed to take into account situations, such as a robotic device that does not perform as efficient as desired, a robotic device that becomes unavailable, a broken drill bit, a delay in the availability of a robotic device, operator error, variance between the computer-aided design representation of the parts and the actual parts, interruptions of the process, machine maintenance emergency stops, or some other unforeseen situation.

As depicted, control system 118 with robotic devices form robotic task system 121. In the illustrative example, task planner 120, path planner 122, and robotic device controller 124 in control system 118 may be implemented in software, hardware, firmware or a combination thereof. When software is used, the operations performed by these components may be implemented in program code configured to run on hardware, such as a processor unit. When firmware is used, the operations performed by task planner 120, path planner 122, and robotic device controller 124 may be implemented in program code and data and stored in persistent memory to run on a processor unit. When hardware is employed, the hardware may include circuits that operate to perform the operations performed by task planner 120, path planner 122, and robotic device controller 124.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable types of hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with programming robotic devices to perform manufacturing operations more efficiently, while reducing the amount of time needed to program the robotic devices. As a result, one or more technical solutions may provide a technical effect of reducing the number of positioning stations 138 needed to perform manufacturing tasks 108. Additionally, the illustrative example may provide one or more technical solutions with a technical effect of reducing the amount of time needed to create robotic control files 156 and provide for more efficient operation of robotic devices 106 controlled by robotic control files 156. This more efficient operation may include a reduction in the number or length of paths 154 used in a manner that reduces the amount of time needed to perform manufacturing tasks 108.

For example, the illustrative example provides one more technical solutions that discreetly consider positioning stations 138 at which robotic devices 106 may perform manufacturing tasks 108. Further, one or more the tenable solutions also identify a minimum number of positioning stations 138 needed to perform all of manufacturing tasks 108. In one illustrative example, this identification of the minimum number of positioning stations 138 may be performed by solving a "set cover" problem to reach a minimum number of positioning stations 138.

As a result, computer system 114 operates as a special purpose computer system in which control system 118 in computer system 114 enables a more efficient performance of manufacturing tasks 108 to manufacture object 102. In particular, control system 118 with task planner 120, path planner 122, and robotic device controller 124 transforms control system 118 into a special purpose computer system as compared to currently available general computer systems that do not have control system 118.

As depicted, computer system 114 with control system 118 identifies information 126 in three-dimensional model 132 and uses information 126 to control the operation of robotic devices 106 to manufacture object 102. In these illustrative examples, control system 118 in computer system 114 identifies machining tasks 110 to perform in object 102. Further, control system 118 organizes machining tasks 110 a manner that allows for at least one of a reduced time, a reduced use of robotic devices 106, or other efficiencies in object 102.

Figure 2:
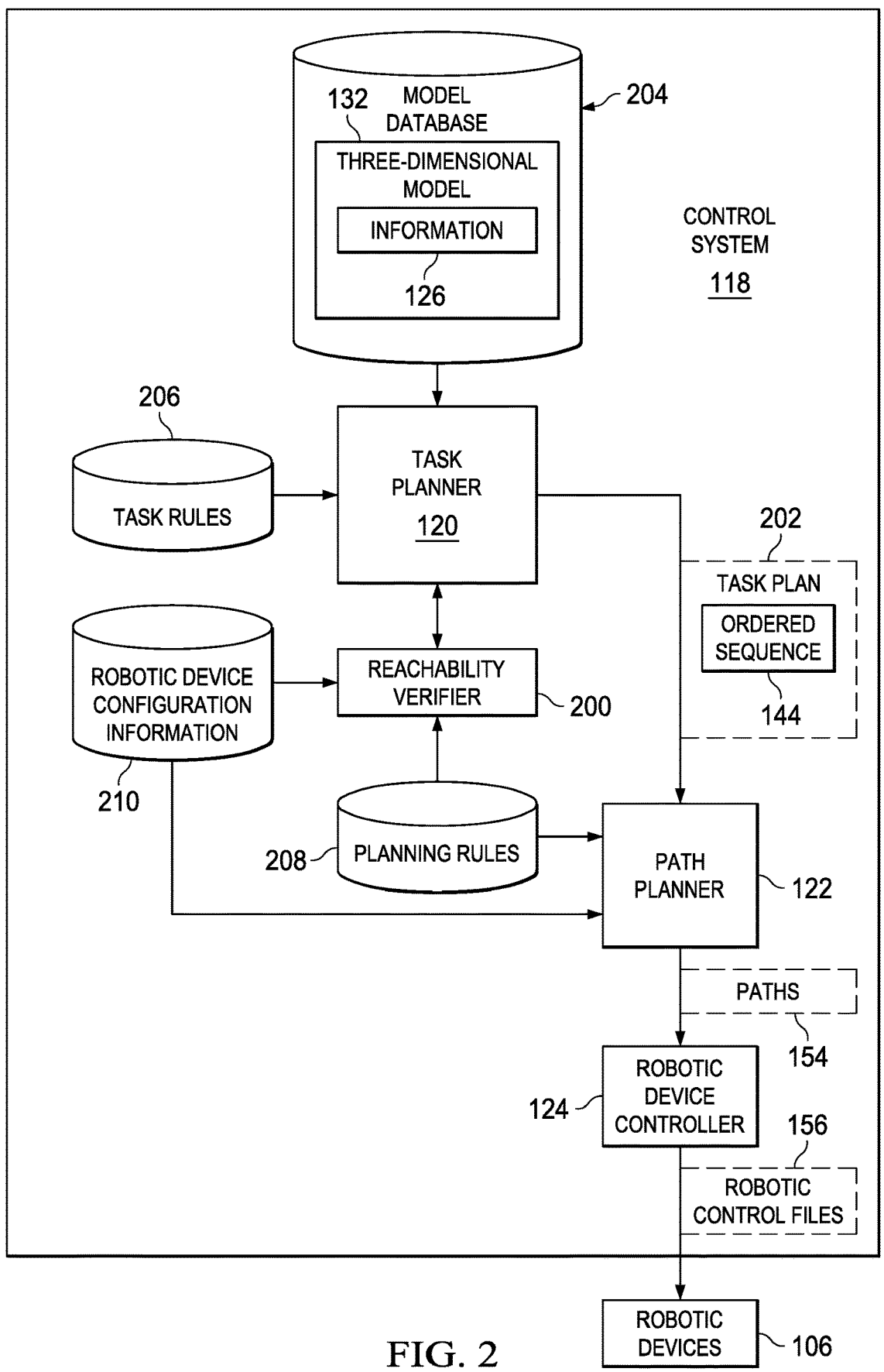
FIG. 2 is an illustration of a control system in accordance with an illustrative embodiment.

With reference next to FIG. 2, an illustration of a control system is depicted in accordance with an illustrative embodiment. In this illustrative embodiment, another configuration for control system 118 is depicted.

In this illustrative example, control system 118 includes task planner 120, path planner 122, and robotic device controller 124. Additionally, control system 118 also includes reachability verifier 200.

As depicted, task planner 120 determines ordered sequence 144 to form task plan 202. Ordered sequence 144 is determined using information 126 obtained from three-dimensional model 132. In this example, three-dimensional model 132 is a computer-aided design model located in model database 204. Model database 204 also may include additional computer-aided design models for various objects that may be manufactured.

In determining ordered sequence 144, task planner 120 uses task rules 206. Task rules 206 identifies the manner in which manufacturing tasks 108 are performed at different position stations in positioning stations 138, shown in FIG. 1. Further, task planner 120 also interacts with reachability verifier 200 to determine task locations 140 (shown in FIG. 1) reachable by robot devices 106 at specific positioning stations.

In this illustrative example, reachability verifier 200 receives information from task planner 120. This information includes at least one of a location of a robotic device, an effector type, a force required, a target, or other suitable type of information. Reachability verifier 200 identifies a configuration of the robotic device that may be used by task planner 120 to identify sequence in which manufacturing tasks 108 may be performed. In this depicted example, reachability verifier 200 identifies a configuration using planning rules 208 and robotic device configuration information 210. Planning rules 208 include at least one of limits for the joints and robot positions that should be avoided due to hazardous conditions. The hazardous conditions may be, for example, a joint or robot moving too close to a fixed object or a position that may cause a cable to become twisted or trapped. In this illustrative example, robot device configuration information 210 includes at least one of the robot kinematics and attachments (end effectors). Reachability verifier 200 returns the configuration to task planner 120.

With ordered sequence 144, path planner 122 creates paths 154. Each path in paths 154 contains a sub-set of manufacturing tasks 108 in ordered sequence 144 of manufacturing tasks 108. In creating paths 154, path planner 122 also uses planning rules 208 and robotic device configuration information 210.

A robotic device in robotic devices 106 may have one or more of paths 154 for one or more of positioning stations 138, shown in FIG. 1. In other words, a robotic device may perform manufacturing tasks 108 for more than one path and more than one positioning station.

As depicted, robotic device controller 124 creates robotic control files 156 using paths 154. These files are then used to control the operation of robotic devices 106 to perform manufacturing tasks 108 for object 102.

The illustration of manufacturing environment 100 in the different components in manufacturing environment 100 in FIGS. 1 and 2 is not meant to imply physical or architectural limitations to the manner in which an illustrative embodiment may be implemented. Other components, in addition to or in or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, computer system 114 may control robotic devices 106 to manufacture one or more objects in addition to object 102 in manufacturing environment 100. This control may be performed such that the objects are manufactured in parallel or sequentially depending on the particular implementation. Further, other types of manufacturing tasks 108, other than machining tasks 110 and fastening tasks 112, may be managed using computer system 114. For example, manufacturing tasks 108 may also include at least one of painting, inspection, testing, or other suitable types of tasks that are performed to manufacture object 102.

As yet another example, object 102 may take other forms than aircraft 104. For example, object 102 may be selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, a skin panel, or some other suitable type of object.

In the illustrative example, model database 204, task rules 206, planning rules 208, and robotic device configuration information 210 are shown as being located in control system 118. In other illustrative examples, one or more of these components may be located outside of control system 118.

Figure 3:
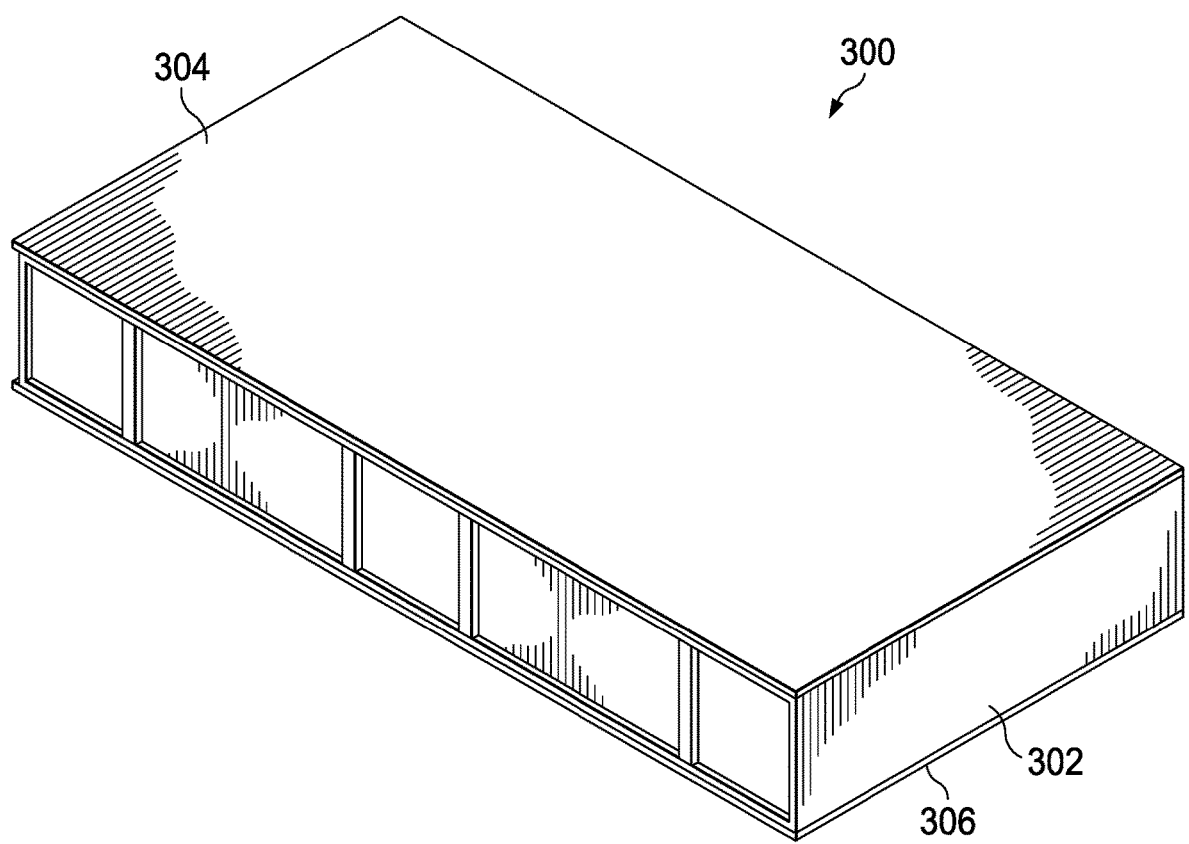
FIG. 3 is an illustration of an object that may be manufactured using a control system in accordance with an illustrative embodiment.

With reference next to FIGS. 3-9, an illustration of a process for manufacturing objects is depicted in accordance with an illustrative environment. With reference first to FIG. 3, an illustration of an object that may be manufactured using a control system is depicted in accordance with an illustrative embodiment. As depicted, object 300 is an example of an object that may be manufactured in manufacturing environment 100 in FIG. 1.

In this example, object 300 has base 302, first cover 304, and second cover 306. In object 300, first cover 304 and second cover 306 are associated with base 302.

When one component is "associated" with another component, the association is a physical association. For example, a first component, first cover 304, may be considered to be physically associated with a second component, base 302, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

Figure 4:
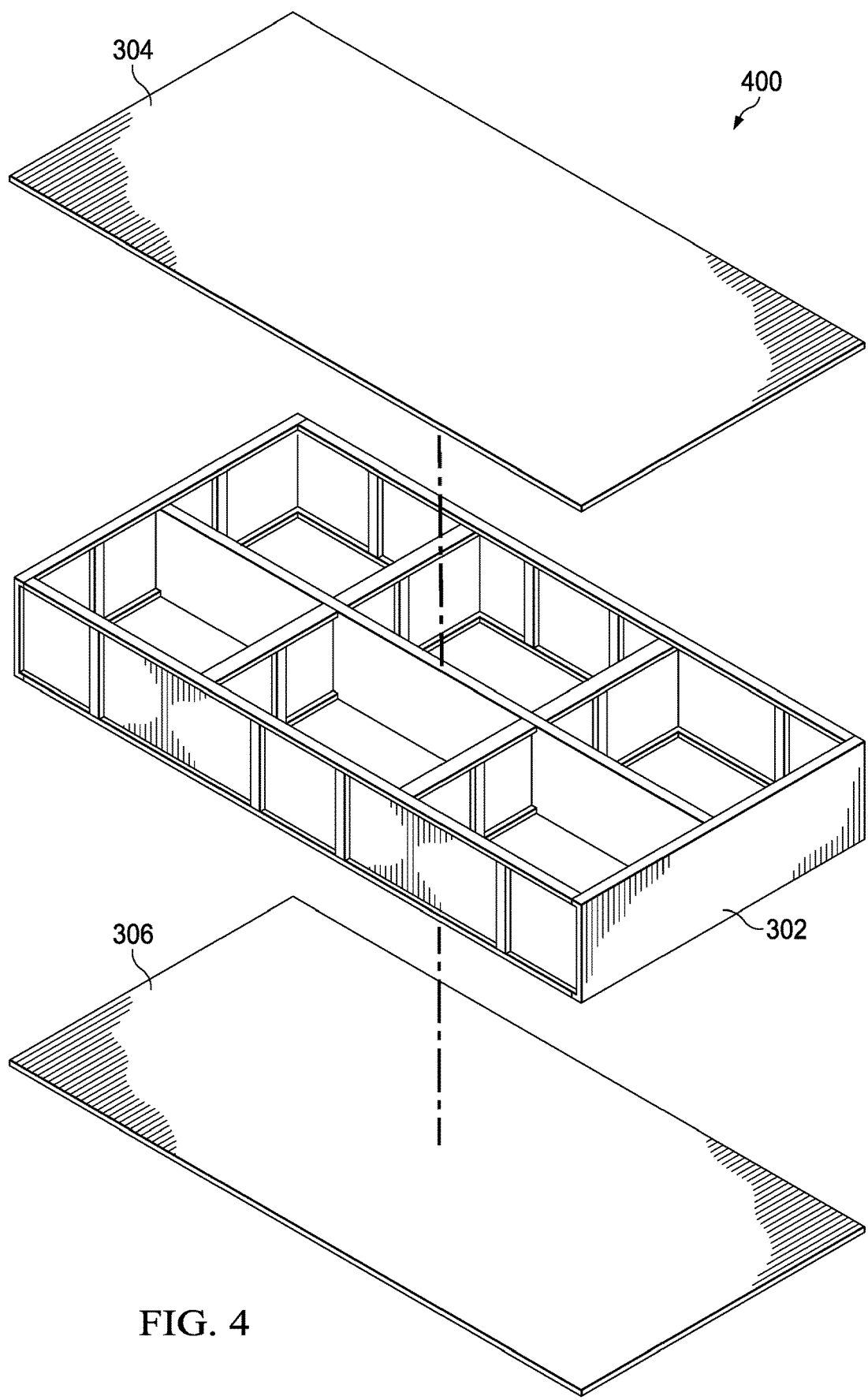
FIG. 4 is an illustration of an exploded view of an object in accordance with an illustrative embodiment.

In this illustrative example, first cover 304 and second cover 306 are associated with base 302 using fasteners (not shown). Machining operations are used to create holes (not shown) for the fasteners, and fastening operations are used to install the fasteners. Turning now to FIG. 4, an illustration of an exploded view of an object is depicted in accordance with an illustrative embodiment.

Figure 5:
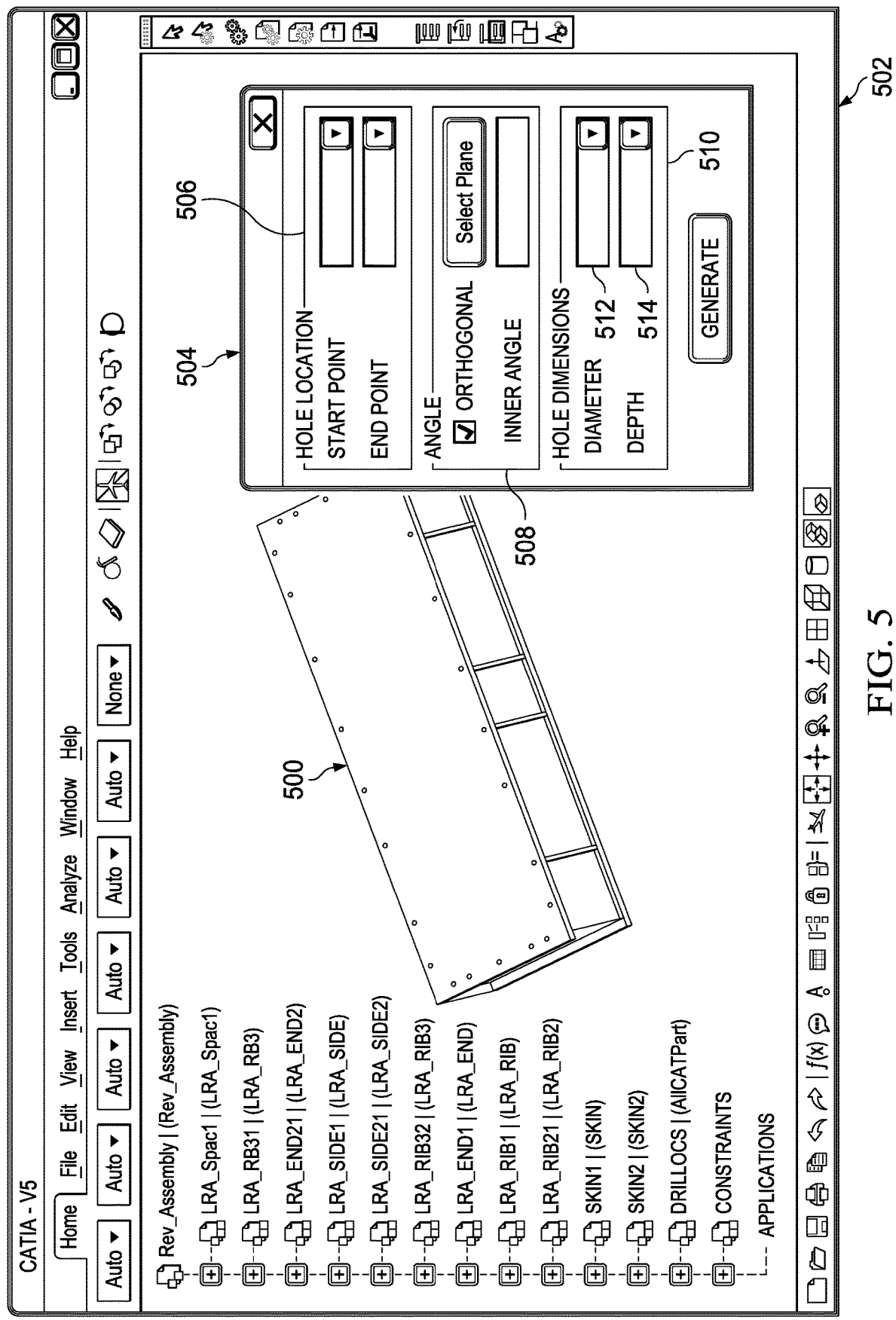
FIG. 5 is an illustration of a display of a computer-aided design model in accordance with an illustrative embodiment.

With reference next to FIG. 5, an illustration of a display of a computer-aided design model is depicted in accordance with an illustrative embodiment. In the illustrative example, three-dimensional model 500 of object 300 is displayed in window 502. Window 502 may be displayed in a data processing system in computer system 114 shown in FIG. 1.

In this illustrative example, a visualization of information in three-dimensional model 500 is shown in window 504. Information about three-dimensional model 500 is shown in window 504.

This information in window 504 is also referred to as metadata for object 300. The metadata may be used to identify manufacturing tasks that are performed to manufacture object 300.

As depicted, the information illustrated in window 504 includes hole locations 506. Hole locations 506 are locations where fasteners may be installed. Angle 508 identifies the angle for the holes. Hole dimensions 510 identify diameter 512 and depth 514 for the holes. The information may also include other types of information selected from a faster type, collar type, and other types of information used for manufacturing tasks to manufacture object 300. From the metadata associated with the three-dimensional model and related geometry information for the plurality of holes, fasteners, etc., the task planner can use the information to create a task file containing machining tasks, fastener installation tasks, etc., where each machining task in the task file, for example, includes location coordinates for each respective hole in the plurality of holes.

Figure 6:
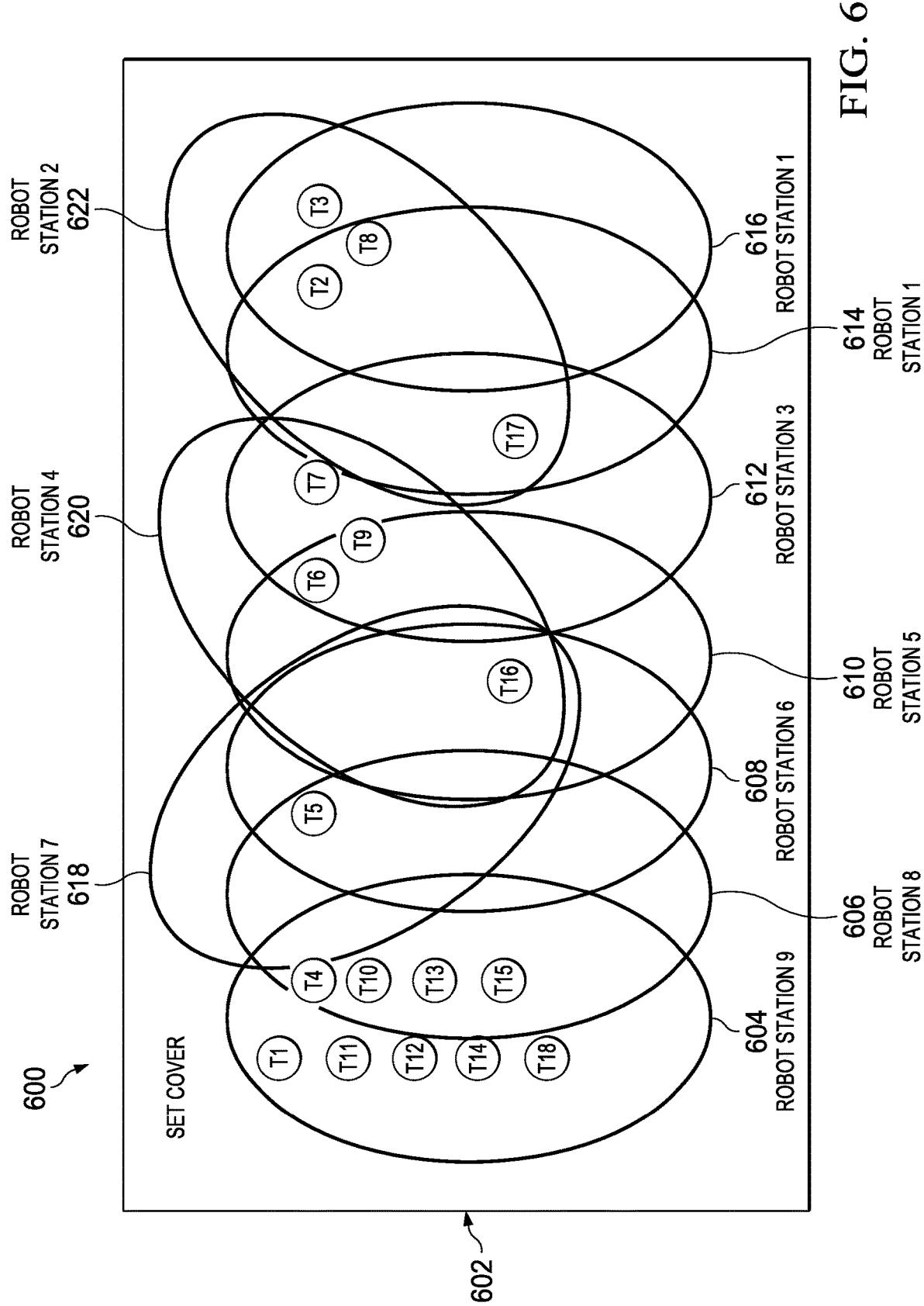
FIG. 6 is an illustration of manufacturing tasks in accordance with an illustrative embodiment.

In FIG. 6, an illustration of manufacturing tasks is depicted in accordance with an illustrative embodiment. In this figure, manufacturing tasks 600 are displayed in window 602. Manufacturing tasks 600 may be grouped into sets based on the type of task, such as a set of machining tasks, a set of fastener installation tasks, a set of collar installation tasks, etc. Manufacturing tasks 600 are shown as being grouped into sets in which each set contains manufacturing tasks in manufacturing tasks 600 that are reachable from a positioning station for a robotic device. As depicted, the sets include set 604, set 606, set 608, set 610, set 612, set 614, set 616, set 618, set 620, and set 622.

Figure 7:
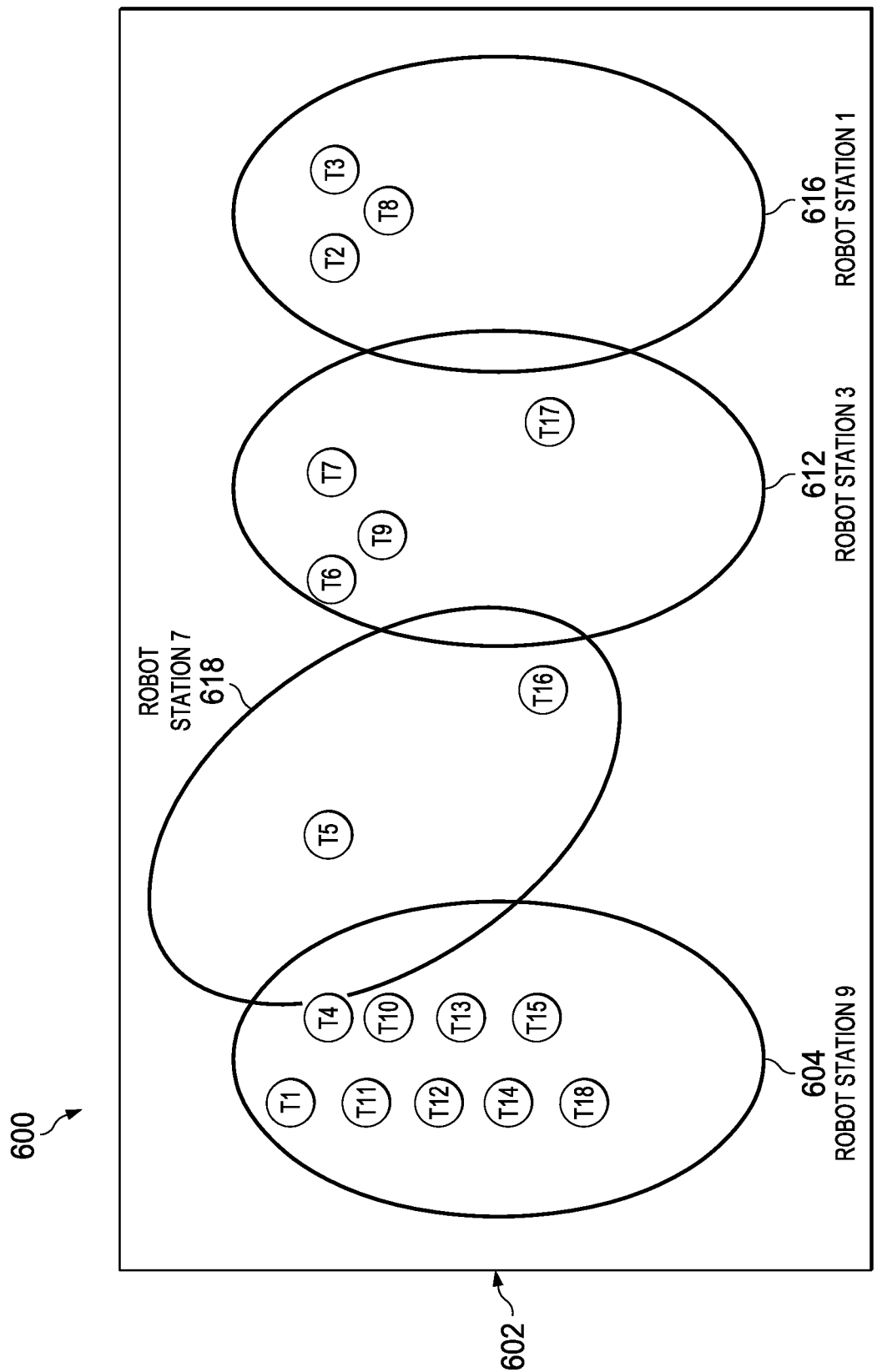
FIG. 7 is an illustration of a set of manufacturing tasks selected for use to manufacture an object in accordance with an illustrative embodiment.

With reference next to FIG. 7, an illustration of a set of manufacturing tasks selected for use to manufacture an object is depicted in accordance with an illustrative embodiment. In this figure, set 604, set 612, set 616, and set 618 in window 602 have been selected as the sets of manufacturing tasks that will be used to manufacture object 300. The sets shown are a minimum number of sets of manufacturing tasks 600 that include all of manufacturing tasks 600 that need to be performed to manufacture object 300.

The selection of the sets maybe performed any number of different ways. In this illustrative example, the selection is made by solving a "set cover" problem for each of the sets. As depicted, the "set cover" problem is a classical question in combinatorics, computer science and complexity theory. The problem is one of Karp's 21 NP-complete problems are shown to be NP-complete. This problem has been used in the field of approximation algorithms.

Figure 8:
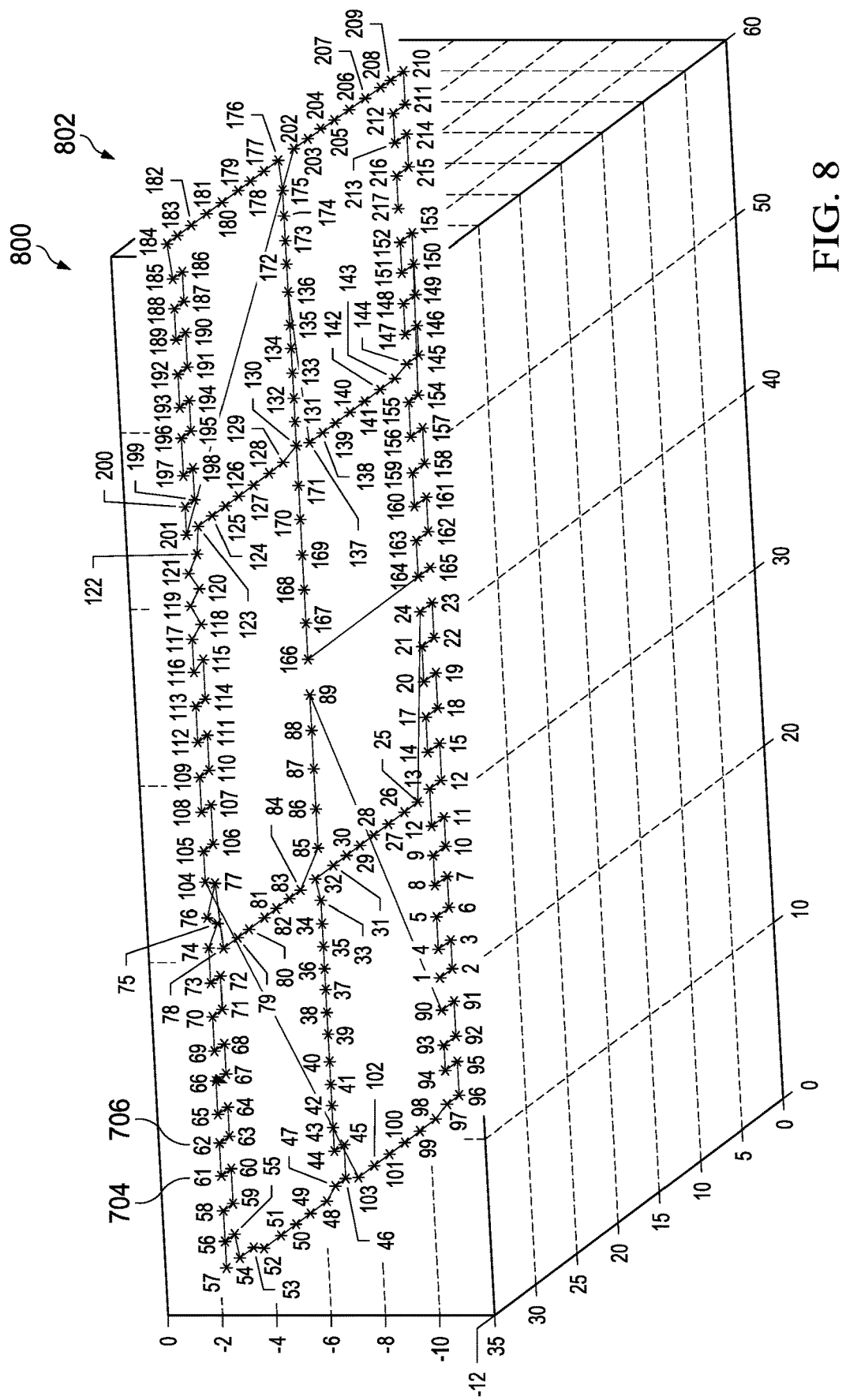
FIG. 8 is an illustration of manufacturing tasks in an ordered sequence is depicted in accordance with an illustrative embodiment.

With reference now to FIG. 8, illustration of manufacturing tasks in an ordered sequence is depicted in accordance with an illustrative embodiment. In this illustrative example, manufacturing tasks 800 are shown window 802 in an order in which manufacturing tasks are to be performed at positioning stations using information from the computer-aided design model. Window 802 may be displayed in computer system 114 in FIG. 1.

As depicted, each manufacturing task in manufacturing tasks 800 is shown in association with a number to indicate the order in which manufacturing tasks is to be performed. For example, manufacturing task 704 is labeled 61. Manufacturing task 706 is labeled 62.

These numbers indicate an ordered sequence in which the manufacturing tasks are to be performed. Manufacturing task 704 is performed prior to manufacturing task 706. Additionally, manufacturing tasks 800 is shown in locations where manufacturing tasks 800 are to be performed to manufacture object 300.

Figure 9:
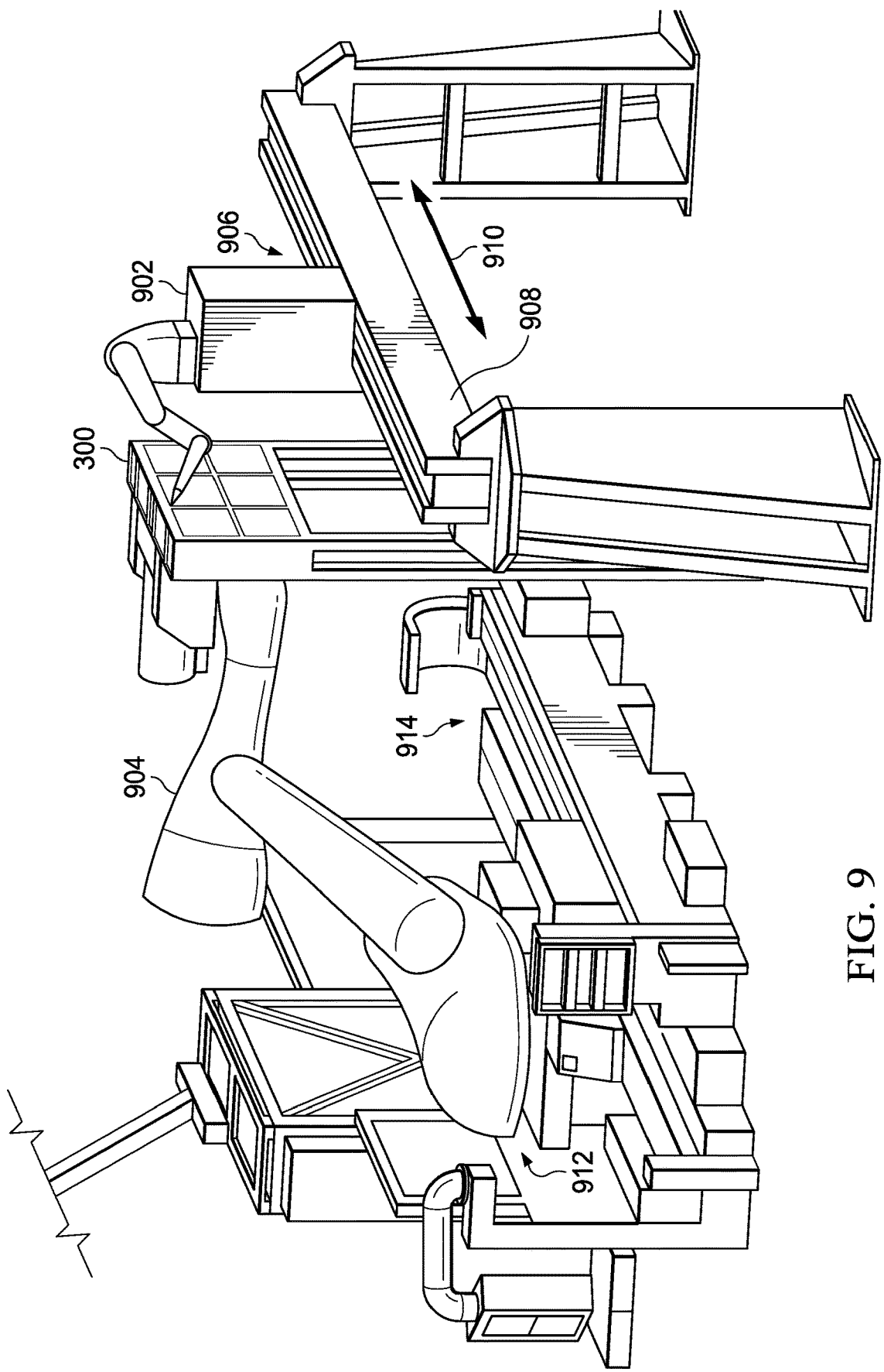
FIG. 9 is an illustration of performing machining tasks to manufacture an object in accordance with illustrative embodiment.

Turning now to FIG. 9, an illustration of performing machining tasks to manufacture an object is depicted in accordance with illustrative embodiment. In this illustrative example, base 302 is a part for object 300 in which machining operations are performed.

As depicted, machining operations are formed by robotic device 902 and robotic device 904. These two robotic devices are programmed using the sets of tasks identified in FIG. 8.

Each robotic device is located at a positioning station. For example, robotic device 902 is located at positioning station 906 on rail 908. Robotic device 902 may move in the direction of arrow 910 to reach the positioning stations as needed to perform machining tasks. Robotic device 904 is located at positioning station 912 on track 914 and also may move in the direction of arrow 910 to reach different positioning stations.

Robotic Device 904 also may be configured to perform fastener installation tasks, for example, after performing machining tasks. As previously described, task planner 120 can identify a sets of fastener installation tasks from all of manufacturing tasks 600 that need to be performed (as determined using metadata associated with the three-dimensional model and related geometry information). Task planner 120 is also configured to determine a minimum number of positioning stations, at which at least one robotic device, such as robotic device 904, is positioned to perform fastener installation tasks, where a sub-set of the fastener installation tasks are performed at each of the minimum number of positioning stations. The minimum number of positioning stations is determined by identifying from a plurality of potential positioning stations with a maximum number of fastener installation tasks at a potential station location that are reachable by robotic device 904, where a sub-set of fastener installation tasks are performed at each positioning station in the minimum number of positioning stations. Accordingly, Task planner 120 is configured to determine and implement a plurality of different manufacturing tasks performed by a plurality of robotic devices, at a minimum number of positioning stations for each robotic device, where a sub-set of the manufacturing tasks are performed at each of the minimum number of positioning stations by each robotic device.

The illustration of FIGS. 3-9 is presented for illustrating one manner in which an object may be manufactured and not meant to limit the manner in which an illustrative example may be implemented. For example, information displayed in window 502 in FIG. 5 and window 602 in FIG. 6 are shown for purposes of providing a visualization of information use to perform manufacturing tasks. In other illustrative examples, the information may not be displayed. Instead, the operations performed to manufacture object may be performed by the computer system without needing to display information to a user. Is still another example, robotic device 902 and robotic device 904 may move in two or three dimensions to different positioning stations rather than linearly, as shown in FIG. 9.

Figure 10:
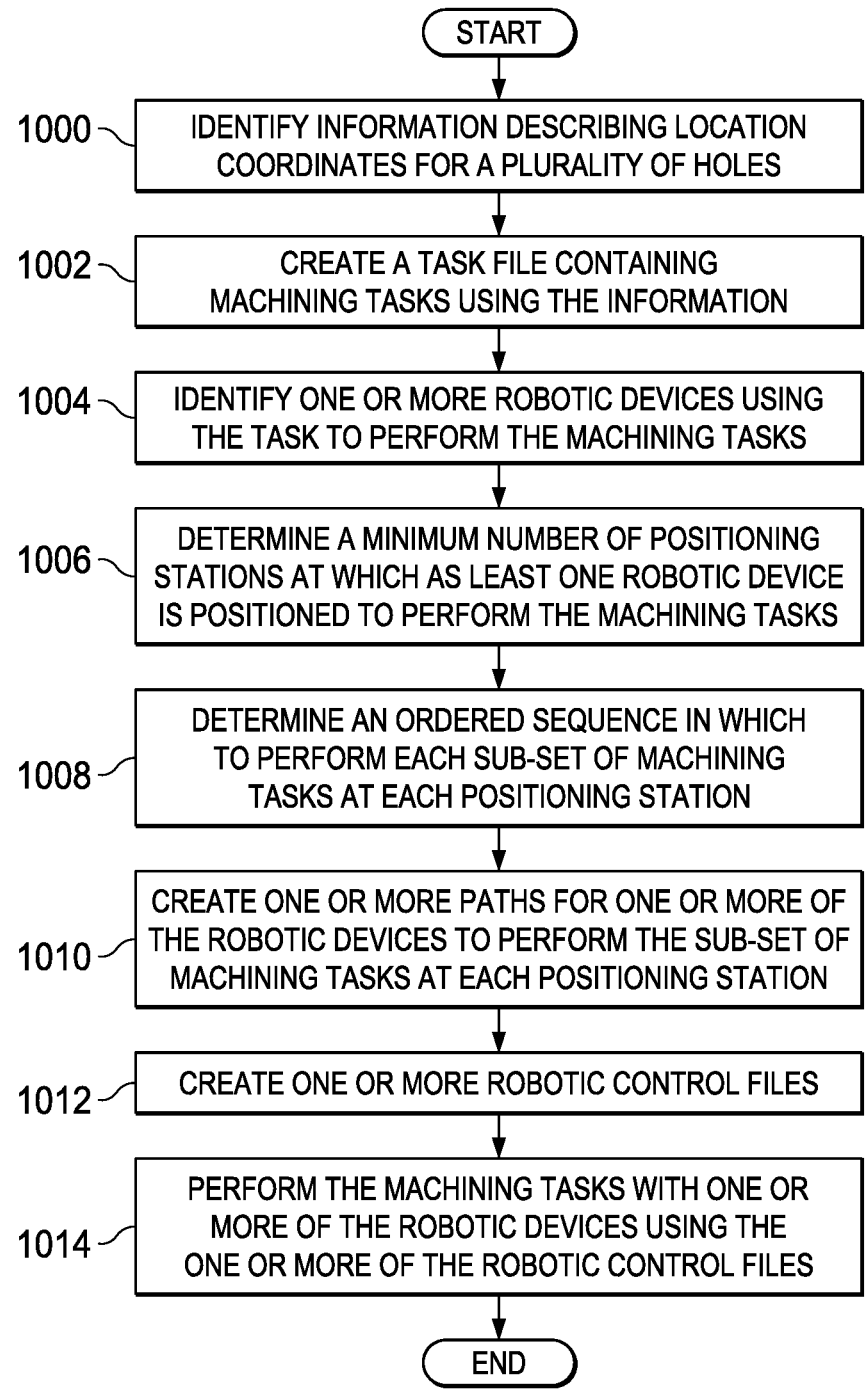
FIG. 10 is an illustration of a flowchart of a process for manufacturing objects in accordance with an illustrative embodiment.

Turning next to FIG. 10, a flowchart of a process for manufacturing objects is depicted in accordance with an illustrative embodiment. The process in this illustrative example may be implemented in computer system 114 in FIG. 1. In particular, the different operations may be implemented as program code or hardware in at least one of task planner 120, path planner 122, or robotic device controller 124 to perform manufacturing tasks 108 such as machining tasks 110 to form holes 130 into object 102, all shown in FIG. 1.

The process begins by identifying information describing location coordinates for a plurality of holes (operation 1000). The information is identified from a three-dimensional model of the object. The process creates a task file containing machining tasks using the information (operation 1002). Each machining task in the machining tasks in the task file includes location coordinates for each respective hole in the plurality of holes.

The process identifies one or more robotic devices using the task file to perform the machining tasks (operation 1004). The process also determines a minimum number of positioning stations at which at least one robotic device is positioned to perform the machining tasks (operation 1006).

In operation, 1006 a portion of the machining tasks are performed at each of the minimum number of positioning stations. Also, the minimum number of positioning stations in operation 1006 is determined by identifying from a plurality of potential positioning stations, those of the plurality of potential positioning stations with a maximum number of the machining tasks at task locations reachable by the robotic devices. A sub-set of machining tasks is performed at each positioning station.

The process also determines an ordered sequence in which to perform each sub-set of machining tasks at each positioning station (operation 1008). In operation 1008, distance across a span of the task locations is iteratively calculated to determine a path having a near-minimum distance. In this illustrative example, the span of the task locations is the distance between all of the task locations being considered for a particular path. A path that has been short a span is a path having a near-minimum distance in this illustrative example.

The task planner transforms the action of scheduling the tasks to an instance of the Traveling Salesman Problem (TSP). This problem is where the nodes are hole locations and the distance between two locations is the distance the robot travels to move from one location to another. Then the Traveling Salesman Problem is solved using a branch and bound method. During the branch and bound method, many paths are evaluated, and the one with the total minimum distance is selected. The resulting path is the sequenced tasks.

The total minimum distance is the near-minimum distance because this process may identify the optimal minimum distance the distance is close enough to use in identifying a path for the tasks. The resulting path is the sequenced tasks. In the illustrative examples, the near-minimum distance is the Euclidean distance traveled by the robot's tool center point.

The process creates one or more paths for one or more of the robotic devices to perform the sub-set of machining tasks at each positioning station (operation 1010). In operation 1010, one or more paths for one or more of the robotic devices to perform the sub-set of machining tasks at each positioning station may be created such that at least one of a distance traveled by a base for a robotic device or a robotic end effector for the robotic device is reduced.

Next, the process creates one or more robotic control files (operation 1012). In operation 1012, the robotic control files cause one or more of the robotic devices to perform the machining tasks at the minimum number of positioning stations. One or more of the robotic control files are output to one or more of the robotic devices enabling one or more of the robotic devices to perform the machining tasks to form the plurality of holes.

The process then performs the machining tasks with one or more of the robotic devices using the one or more of the robotic control files (operation 1014). The process terminates thereafter. The process in FIG. 10 to perform any number of times for any number of objects.

Although the process illustrated in FIG. 10 is implemented to form holes 130 and object 102, the different operations also implement it to perform other types of manufacturing tasks 108 in addition to or in place of machining tasks 110. For example, process may be implemented to perform fastening tasks 112 or other test such as inspection, painting, or other suitable test to manufacture object 102. With fastening tasks 112, the paths may be referred to as fastening paths in which fastening operations are performed.

Figure 11:
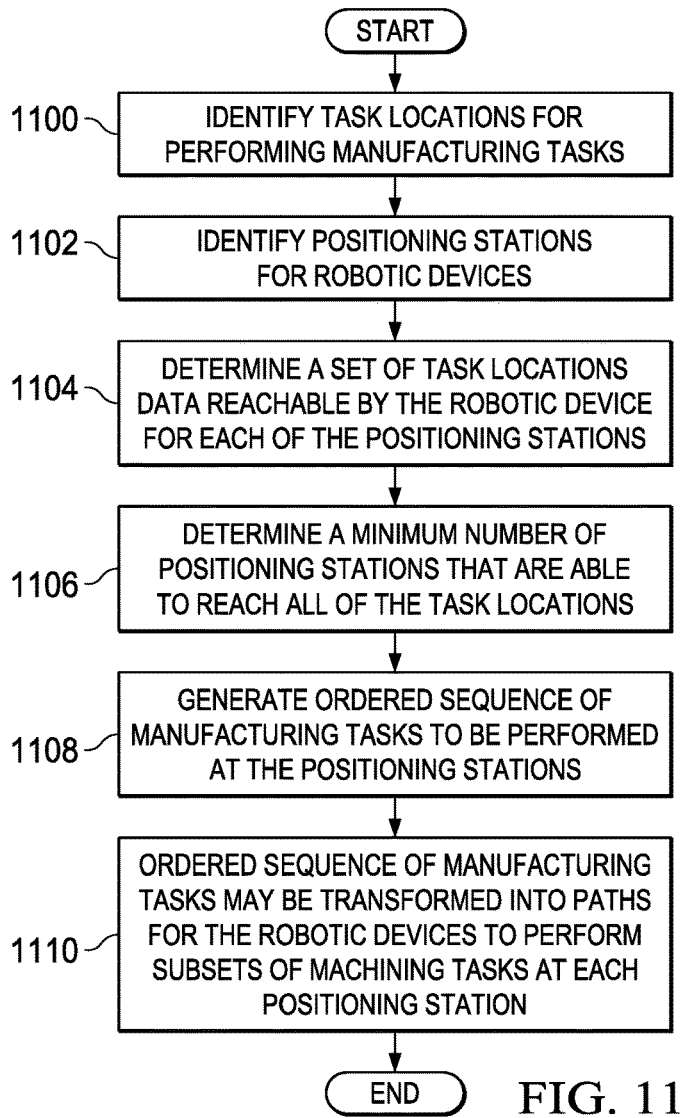
FIG. 11 is an illustration of a flowchart of a process for determining manufacturing tasks to be performed at positioning stations in accordance with an illustrative embodiment.

With reference to FIG. 11, an illustration of a flowchart of a process for determining manufacturing tasks to be performed at positioning stations is depicted in accordance with an illustrative embodiment. The process in this illustrative example may be implemented in computer system 114 in FIG. 1. In particular, the different operations may be implemented as program code or hardware in task planner 120.

The process begins by identifying task locations for performing manufacturing tasks (operation 1100). The task locations are identified from three-dimensional model of the object. The process identifies positioning stations for robotic devices (step 1102). These positioning stations are locations in which the robotic devices may perform manufacturing tasks.

The process determines a set of task locations data reachable by the robotic device for each of the positioning stations (operation 1104). In operation 1104, the process looks at task locations that have not yet been processed or considered. The process then determines a minimum number of positioning stations that are able to reach all of the task locations (operation 1106). In operation 1106, the process identifies a near-minimum distance to travel to visit each task location.

Operation 1106 may be performed in a number of different ways. In one illustrative example, the minimum number of positioning stations may be determined by solving the "set cover" problem. When using this technique, the "set cover" problem is solved for each of the set of task locations. The solution may be performed by taking account rules identifying how, where, and when the manufacturing tasks should be performed at the different task locations. For example, when drilling holes, manufacturing tasks may be selected to be performed first at task locations in which the same size drill bit is used.

The process then generates ordered sequence of manufacturing tasks to be performed at the positioning stations (operation 1108). The ordered sequence of manufacturing tasks includes subsets of manufacturing tasks that perform at one or more of the positioning stations.

The process then creates one or more paths for the robotic devices. The ordered sequence of manufacturing tasks is transformed into paths for the robotic devices to perform subsets of machining tasks at each position positioning station (operation 1110). The process terminated thereafter. The ordered sequence of manufacturing tasks with the paths may then be used to create robotic control files used to cause the robotic devices to perform the manufacturing tasks. Thereafter, the process terminates.

These control files may take a number of different forms. For example, control files may contain data identifying the sequence of manufacturing tasks and locations for performing the manufacturing tasks. In another example, control files may be commands or programs that are run by processor units for the robotic devices.

Figure 12:
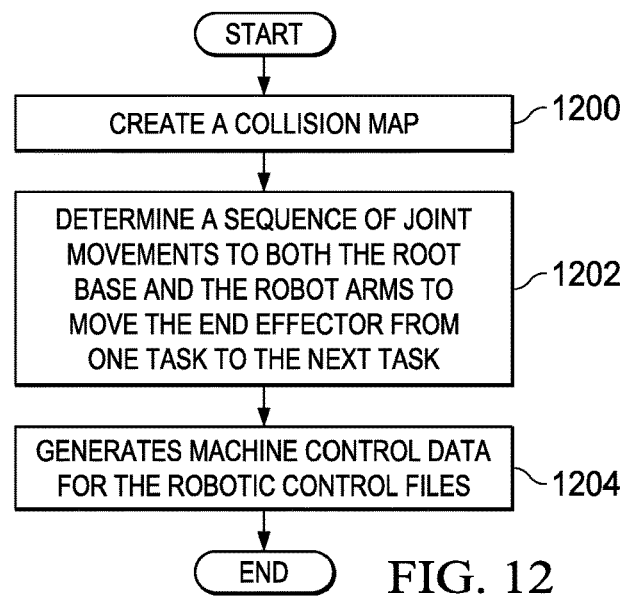
FIG. 12 is an illustration of a flowchart of a process for generating robotic control files in accordance with an illustrative embodiment.

With reference now to FIG. 12, an illustration of a flowchart of a process for generating robotic control files is depicted in accordance with an illustrative embodiment. The process in this illustrative example may be implemented in computer system 114 in FIG. 1. In particular, the different operations may be implemented as program code or hardware in robotic device controller 124.

The process begins by creating a collision map (operation 1200). The collision map identifies potential areas where collisions may occur between robotic devices based on positioning stations for the robotic devices. The collision map also identifies other structures in which collisions may occur from joint movement of the robotic devices at different positioning stations The process then determines a sequence of joint movements to both the root base and the robot arms to move the end effector from one task to the next task (operation 1202). This operation is performed using the ordered sequence of manufacturing tasks generated by the task planner. Operation of 1202 also takes into account potential collisions in the collision map. The sequence of joint movements may be performed to avoid collisions with other robotic devices or structures.

The process then generates machine control data for the robotic control files (operation 1204). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the processes may identify a portion of manufacturing operations that cannot be performed by the group of robotic devices. In this example, the process in FIG. 10 may also identify collision avoidance zones in which these collision avoidance zones may be used to define movement constraints for one or more of the robotic devices.

When this operation of identifying collision avoidance zones is included in the process in FIG. 10, the minimum number of positioning stations may comprise determining the minimum number of positioning stations at which at least one robotic device is positioned to perform the machining tasks in which the portion of the machining tasks are performed at each of the minimum number of positioning stations. The minimum number of positioning stations is determined by identifying from the plurality of potential positioning stations those of the plurality of potential positioning stations with a maximum number of machining tasks reachable by the robotic devices taking into account the collision avoidance zones, where a sub-set of machining tasks are performed at each positioning station.

As another example, the task planning may be performed during manufacturing of the object. In this manner, changes in the manufacturing tasks may occur to take into account different events that may occur during manufacturing. These events may include at least one of broken drill bit, a robotic device malfunction, an operator error, or some other event that may affect the manner in which manufacturing tasks are performed.

Figure 13:
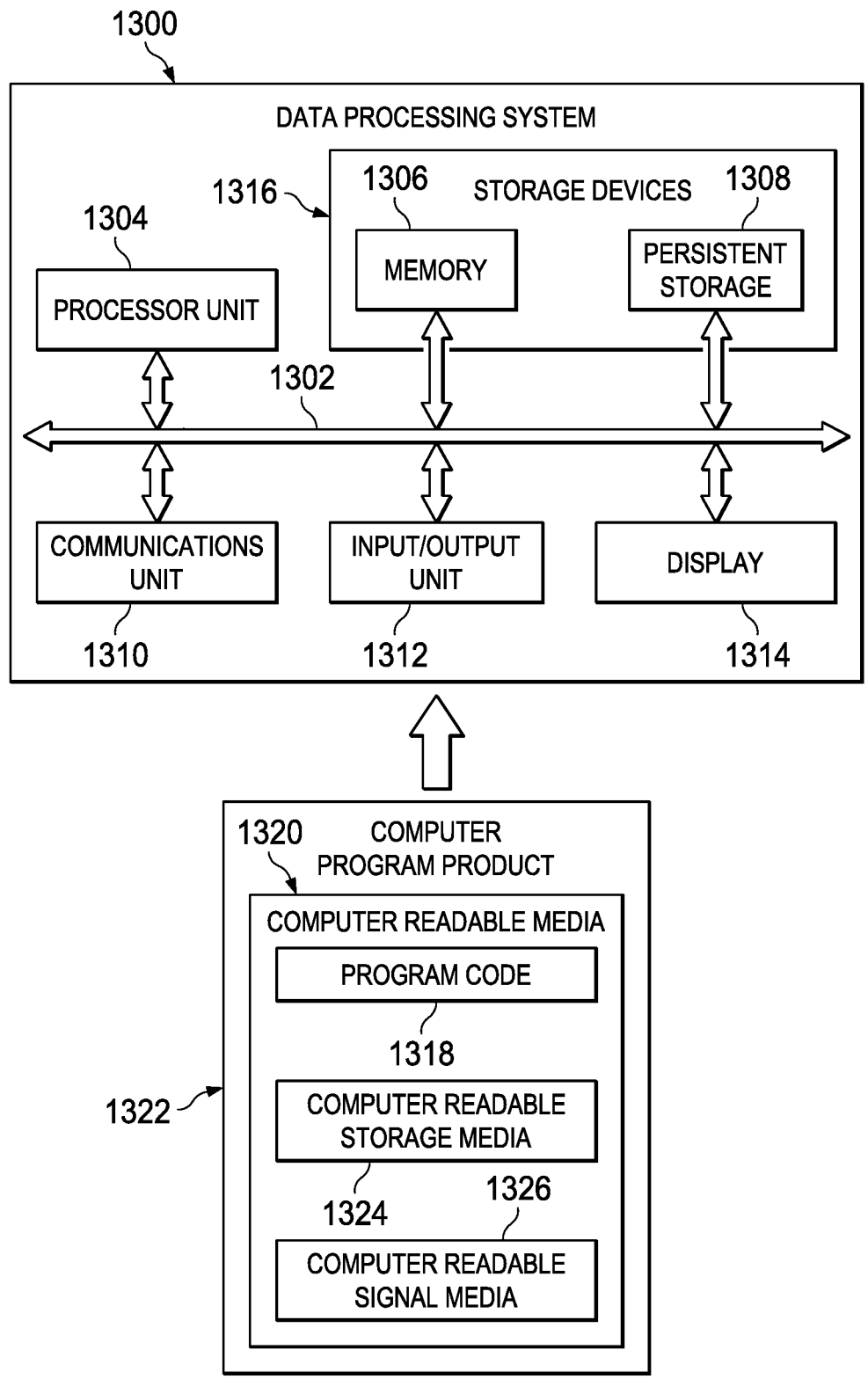
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement computer system 114 in FIG. 1. In this illustrative example, data processing system 1300 includes communications framework 1302, which provides communications between processor unit 1304, memory 1306, persistent storage 1308, communications unit 1310, input/output unit 1312, and display 1314. In this example, communication framework may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a solid state hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer-usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In one example, computer-readable media 1320 may be computer-readable storage media 1324 or computer-readable signal media 1326.

In these illustrative examples, computer-readable storage media 1324 is a physical or tangible storage device used to store program code 1318 rather than a medium that propagates or transmits program code 1318.

Alternatively, program code 1318 may be transferred to data processing system 1300 using computer-readable signal media 1326. Computer-readable signal media 1326 may be, for example, a propagated data signal containing program code 1318. For example, computer-readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Figure 14:
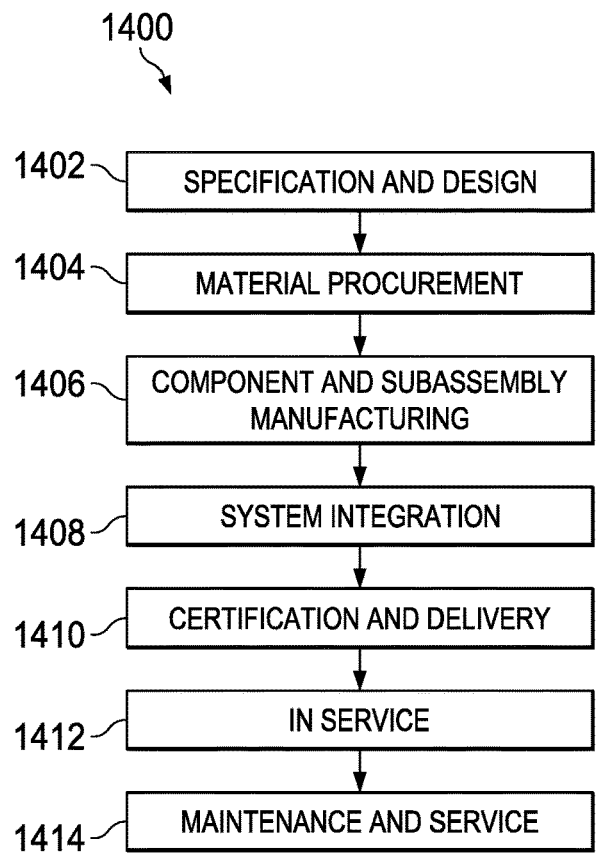
FIG. 14 is an illustration of an aircraft manufacturing and service method in accordance with an illustrative embodiment.
Figure 15:
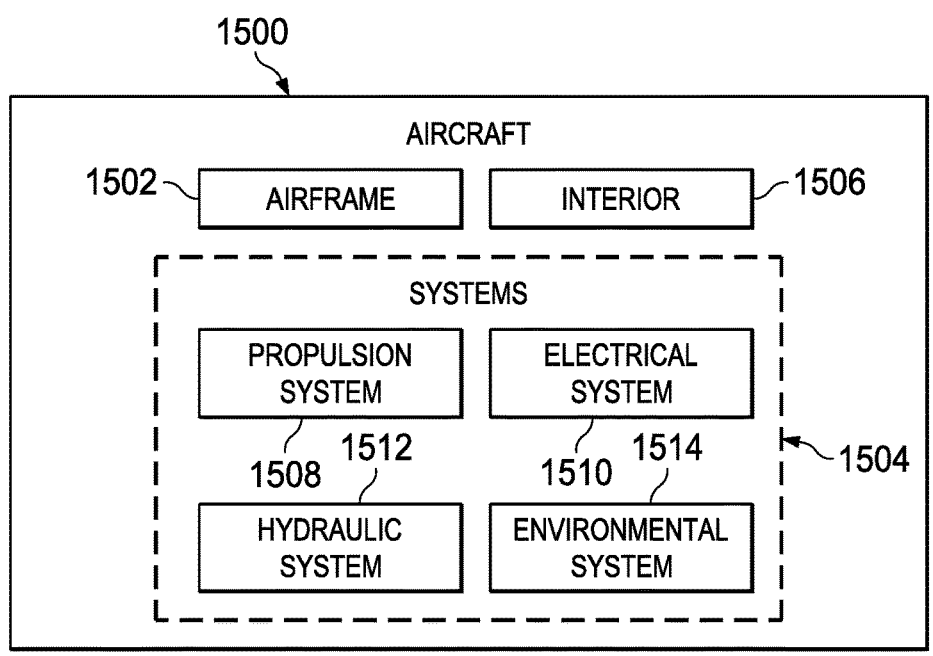
FIG. 15 is an illustration of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both.

The use of a number of the different illustrative embodiments may substantially expedite the assembly of aircraft 1500, reduce the cost of aircraft 1500, or both expedite the assembly of aircraft 1500 and reduce the cost of aircraft 1500. For example, the illustrative embodiments may be used to reduce the amount of time needed to manufacture aircraft 1500 by at least one of reducing the time needed to program robotic devices or programming the robotic devices to more efficiently perform manufacturing tasks such that the manufacturing tasks may be completed more quickly as compared to current techniques for controlling robotic devices.

Figure 16:
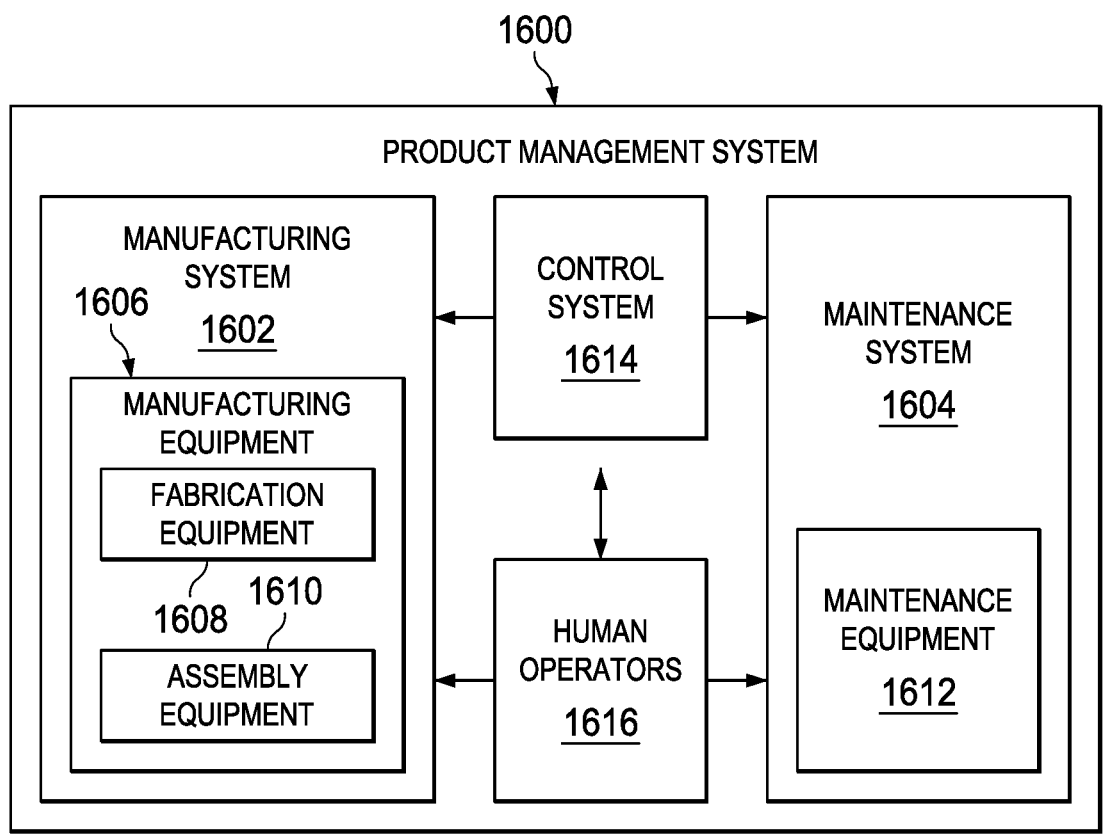
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 may include at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that may be used to fabricate components for parts used to form aircraft 1500. For example, fabrication equipment 1608 may include machines and tools. These machines and tools may be at least one of a drill, a hydraulic press, a furnace, a mold, a composite tape laying machine, a vacuum system, a lathe, or other suitable types of equipment. Fabrication equipment 1608 may be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500. In particular, assembly equipment 1610 may be used to assemble components and parts to form aircraft 1500. Assembly equipment 1610 also may include machines and tools. These machines and tools may be at least one of a robotic arm, a crawler, a faster installation system, a rail-based drilling system, or a robot. Assembly equipment 1610 may be used to assemble parts such as seats, horizontal stabilizers, wings, engines, engine housings, landing gear systems, and other parts for aircraft 1500.

In this illustrative example, maintenance system 1604 includes maintenance equipment 1612. Maintenance equipment 1612 may include any equipment needed to perform maintenance on aircraft 1500. Maintenance equipment 1612 may include tools for performing different operations on parts on aircraft 1500. These operations may include at least one of disassembling parts, refurbishing parts, inspecting parts, reworking parts, manufacturing replacement parts, or other operations for performing maintenance on aircraft 1500. These operations may be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable device. In some cases, maintenance equipment 1612 may include fabrication equipment 1608, assembly equipment 1610, or both to produce and assemble parts that may be needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 may control the operation of at least one of fabrication equipment 1608, assembly equipment 1610, or maintenance equipment 1612. This equipment includes robotic devices that may be used to manufacture objects during fabrication or maintenance.

The hardware in control system 1614 may be using hardware that may include computers, circuits, networks, and other types of equipment. The control may take the form of direct control of manufacturing equipment 1606. For example, robots, robotic devices, computer-controlled machines, and other equipment may be controlled by control system 1614. In other illustrative examples, control system 1614 may manage operations performed by human operators 1616 in manufacturing or performing maintenance on aircraft 1500. For example, control system 1614 may assign tasks, provide instructions, display models, or perform other operations to manage operations performed by human operators 1616. In these illustrative examples, control system 118 from FIG. 1 may be used to implement control system 1614 to manage at least one of the manufacturing or maintenance of aircraft 1500 in FIG. 15.

In the different illustrative examples, human operators 1616 may operate or interact with at least one of manufacturing equipment 1606, maintenance equipment 1612, or control system 1614. This interaction may be performed to manufacture aircraft 1500.

Of course, product management system 1600 may be configured to manage other products other than aircraft 1500. Although product management system 1600 has been described with respect to manufacturing in the aerospace industry, product management system 1600 may be configured to manage products for other industries. For example, product management system 1600 may be configured to manufacture products for the automotive industry as well as any other suitable industries.

Thus, illustrative embodiments provide a method and apparatus for implementing manufacturing tasks using robotic devices from a minimum number of positioning stations. In the illustrative examples, the cost for implementing manufacturing tasks to manufacture objects using robotic devices may be reduced using a control system. In one illustrative example, the control system includes a task planner, a path planner, and a robotic device controller. With the control system in the illustrative example, sequences of manufacturing task may be performed while avoiding collisions and taking into account rules for manufacturing objects. A control system also may be implemented to schedule manufacturing tasks in a manner that reduces the overall time to complete the manufacturing tasks.

One or more illustrative examples provide a technical solution in which the time needed to create robotic control files, such as those created by numerical control programming, may be reduced as compared to currently used techniques. Further, the creation of robotic control files may include commands were sequences for robotic devices that increase the efficiency at which the robotic devices perform manufacturing tasks. In one illustrative example, the increased efficiency occurs through optimizing task sequencing as described in the different illustrative examples. For example, the illustrative examples discreetly consider positioning stations at which robotic devices may perform manufacturing tasks. Further, the illustrative examples use solve a "set cover" problem to reach a minimum number of positioning stations needed to reach all of the manufacturing tasks that are to be performed.

The description of the different illustrative embodiments has been presented for purposes of illustration and description and is not intended to be exhaustive or limited to the embodiments in the form disclosed. The different illustrative examples describe components that perform actions or operations.=In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for implementing machining tasks for an object, the method comprising:

identifying information describing location coordinates for a plurality of holes, wherein the information is identified from a three-dimensional model of the object;

creating a task file containing the machining tasks using the information, wherein each machining task includes the location coordinates for each respective hole in the plurality of holes;

identifying one or more robotic devices using the task file to perform the machining tasks;

determining a minimum number of positioning stations at which at least one robotic device is positioned to perform the machining tasks in which a portion of the machining tasks are performed at each of the minimum number of positioning stations, wherein the minimum number of positioning stations is determined by identifying from a plurality of potential positioning stations those of the plurality of potential positioning stations with a maximum number of the machining tasks at task locations reachable by the robotic devices, where a sub-set of machining tasks are performed at each positioning station;

determining an ordered sequence in which to perform each of the sub-set of machining tasks at each positioning station, by iteratively calculating a distance across a span of the task locations to determine a path having a near-minimum distance;

creating one or more paths for one or more of the robotic devices to perform the sub-set of machining tasks at each positioning station; and creating one or more robotic control files that causes one or more of the robotic devices to perform the machining tasks at the minimum number of positioning stations, wherein one or more of the robotic control files are output to one or more of the robotic devices enabling one or more of the robotic devices to perform the machining tasks to form the plurality of holes.

2. The method of claim 1 further comprising:

performing the machining tasks with one or more of the robotic devices using the one or more of the robotic control files.

3. The method of claim 1 further comprising:

identifying collision avoidance zones defining movement constraints for the one or more of the robotic devices;

wherein determining the minimum number of positioning stations at which at least one robotic device is positioned to perform the machining tasks in which the portion of the machining tasks are performed at each of the minimum number of positioning stations comprises:

determining the minimum number of positioning stations at which at least one robotic device is positioned to perform the machining tasks in which the portion of the machining tasks are performed at each of the minimum number of positioning stations, wherein the minimum number of positioning stations is determined by identifying from the plurality of potential positioning stations those of the plurality of potential positioning stations with a maximum number of machining tasks reachable by the robotic devices taking into account the collision avoidance zones, where the sub-set of machining tasks are performed at each positioning station.

4. The method of claim 1, wherein creating one or more paths for one or more of the robotic devices to perform the sub-set of machining tasks at each positioning station comprises:

creating, by a path planner, one or more of the paths for one or more of the robotic devices to perform the sub-set of machining tasks at each positioning station such that at least one of a distance traveled by a base for the robotic device or a robotic end effector for the robotic device is reduced.

5. The method of claim 1 further comprising:
identifying a portion of manufacturing operations that cannot be performed by a group of robotic devices.

6. The method of claim 1 further comprising:
identifying location coordinates for fasteners;
placing fastening tasks in the task file, wherein each fastening task includes the location coordinates for each respective hole in the plurality of holes in which a fastener is to be installed;
determining a minimum number of positioning stations at which at least one robotic device is positioned to perform the fastening tasks in which a portion of the fastening tasks are performed at each of the minimum number of positioning stations, wherein the minimum number of positioning stations is determined by identifying from the plurality of potential positioning stations those of the plurality of potential positioning stations with a maximum number of the fastening tasks at the task locations reachable by the robotic device, where a sub-set of fastening tasks are performed at each positioning station;
determining an ordered sequence in which to perform each of the sub-set of fastening tasks at each positioning station, by iteratively calculating a distance across a span of the task locations to determine a fastener path having a near-minimum distance;
creating one or more fastener paths for one or more of the robotic devices to perform the sub-set of fastening tasks at each positioning station; and
creating one or more robotic control files that causes the one or more of the robotic devices to perform the fastening tasks at the minimum number of positioning stations, wherein one or more of the robotic control files are output to the one or more of the robotic devices enabling one or more of the robotic devices to perform the fastening tasks to install the fasteners in the plurality of holes.

7. The method of claim 1, wherein the information is selected from at least one of a drill location, a group of dimensions for a hole, a diameter of the hole, a fastener type, or a collar type.

8. The method of claim 1, wherein the object is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, and a skin panel.

9. A manufacturing system comprising:
a computer system;
a task planner running the on the computer system, wherein the task planner identifies information describing location coordinates for a plurality of holes, wherein the information is identified from a three-dimensional model of an object; creates a task file containing machining tasks using the information, wherein each machining task includes the location coordinates for each respective hole in the plurality of holes; identifies one or more robotic devices using the task file to perform the machining tasks; determines a minimum number of positioning stations at which at least one robotic device is positioned to perform the machining tasks in which a portion of the machining tasks are performed at each of the minimum number of positioning stations, wherein the minimum number of positioning stations is determined by identifying from a plurality of potential positioning stations those of the plurality of potential positioning stations with a maximum number of the machining tasks at task locations reachable by a robotic device, where a sub-set of machining tasks are performed at each positioning station; and determines an ordered sequence in which to perform each of the sub-set of machining tasks at each positioning station, by iteratively calculating a distance across a span of the task locations to determine a path having a near-minimum distance;
a path planner, running on the computer system, that creates one or more paths for one or more of the robotic devices to perform the sub-set of machining tasks at each positioning station using the ordered sequence; and
a robotic device controller, running on the computer system, wherein the robotic device controller creates one or more robotic control files that causes one or more of the robotic devices to perform the machining tasks at the minimum number of positioning stations, and wherein the one or more of the robotic control files are output to one or more of the robotic devices enabling the one or more of the robotic devices to perform the machining tasks to form the plurality of holes.

10. The manufacturing system of claim 9, wherein the machining tasks are performed with the one or more of the robotic devices using the one or more of the robotic control files.

11. The manufacturing system of claim 9, wherein the task planner identifies collision avoidance zones defining movement constraints for one or more of the robotic devices; wherein in determining the minimum number of positioning stations at which at least one robotic device is positioned to perform the machining tasks in which the portion of the machining tasks are performed at each of the minimum number of positioning stations, the task planner determines the minimum number of positioning stations at which at least one robotic device is positioned to perform the machining tasks in which the portion of the machining tasks are performed at each of the minimum number of positioning stations; and wherein the minimum number of positioning stations is determined by identifying from the plurality of potential positioning stations those of the plurality of potential positioning stations with the maximum number of the machining tasks reachable by the robotic devices taking into account the collision avoidance zones, where the sub-set of machining tasks are performed at each positioning station.

12. The manufacturing system of claim 9, wherein in creating one or more of the paths for one or more of the robotic devices to perform the sub-set of machining tasks at each positioning station, the path planner creates one or more of the paths for one or more of the robotic devices to perform the sub-set of machining tasks at each positioning station such that at least one of a distance traveled by a base for the robotic device or a robotic end effector for the robotic device is reduced.

13. The manufacturing system of claim 9, wherein the task planner identifies a portion of manufacturing tasks that cannot be performed by a group of robotic devices.

14. The manufacturing system of claim 9, wherein the task planner identifies location coordinates for fasteners; places fastening tasks in the task file, wherein each fastening task includes the location coordinates for each respective hole in the plurality of holes in which a fastener is to be installed; determines a minimum number of positioning stations at which at least one robotic device is positioned to perform the fastening tasks in which a portion of the fastening tasks are performed at each of the minimum number of positioning stations, wherein the minimum number of positioning stations is determined by identifying from a plurality of potential positioning stations those of the plurality of potential positioning stations with a maximum number of the fastening tasks at task locations reachable by the robotic device, where a sub-set of fastening tasks are performed at each positioning station; and determines an ordered sequence in which to perform each of the sub-set of fastening tasks at each positioning station, by iteratively calculating a distance across a span of the task locations to determine a fastener path having a near-minimum distance; and wherein the path planner creates one or more fastener paths for one or more of the robotic devices to perform the sub-set of fastening tasks at each positioning station; and wherein the robotic device controller creates one or more of the robotic control files that causes the one or more robotic devices to perform the fastening tasks at the minimum number of positioning stations, wherein one or more of the robotic control files are output to the one or more of the robotic devices enabling one or more of the robotic devices to perform the fastening tasks to install fasteners in the plurality of holes.

15. The manufacturing system of claim 9, wherein the information is selected from at least one of a drill location, a group of dimensions for a hole, a diameter of the hole, a fastener type, or a collar type.

16. The manufacturing system of claim 9, wherein the object is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, a wing, an engine housing, a fuselage, and a skin panel.

17. A product management system comprising:
   a manufacturing equipment including robotic devices; and
   a control system that controls operation of the manufacturing equipment, wherein the control system identifies information describing location coordinates for a plurality of holes, wherein the information is identified from a three-dimensional model of an object; creates a task file containing machining tasks using the information, wherein each machining task includes location coordinates for each respective hole in the plurality of holes; identifies one or more robotic devices using the task file to perform the machining tasks; determines a minimum number of positioning stations at which at least one robotic device is positioned to perform the machining tasks in which a portion of the machining tasks are performed at each of the minimum number of positioning stations, wherein the minimum number of positioning stations is determined by identifying from a plurality of potential positioning stations those of the plurality of potential positioning stations with a maximum number of the machining tasks at task locations reachable by the robotic device, where a sub-set of machining tasks are performed at each positioning station; and determines an ordered sequence in which to perform each of the sub-set of machining tasks at each positioning station, by iteratively calculating a distance across a span of the task locations to determine a path having a near-minimum distance and creates one or more paths for one or more of the robotic devices to perform the sub-set of machining tasks at each positioning station; creates one or more robotic control files that causes one or more of the robotic devices to perform the machining tasks at the minimum number of positioning stations, and wherein one or more of the robotic control files are output to one or more of the robotic devices enabling the one or more of the robotic devices to perform the machining tasks to form the plurality of holes.

18. The product management system of claim 17, wherein the machining tasks are performed with the one or more of the robotic devices using the one or more of the robotic control files.

19. The product management system of claim 17, wherein the control system identifies collision avoidance zones defining movement constraints for one or more of the robotic devices; wherein in determining the minimum number of positioning stations at which at least one robotic device is positioned to perform the machining tasks in which the portion of the machining tasks are performed at each of the minimum number of positioning stations, the control system determines the minimum number of positioning stations at which at least one robotic device is positioned to perform the machining tasks in which the portion of the machining tasks are performed at each of the minimum number of positioning stations; and wherein the minimum number of positioning stations is determined by identifying from the plurality of potential positioning stations those of the plurality of potential positioning stations with the maximum number of machining tasks reachable by the robotic devices taking into account the collision avoidance zones, where the sub-set of machining tasks are performed at each positioning station.

20. The product management system of claim 17, wherein in creating one or more of the paths for one or more of the robotic devices to perform the sub-set of machining tasks at each positioning station, the control system creates one or more of the paths for one or more of the robotic devices to perform the sub-set of machining tasks at each positioning station such that at least one of a distance traveled by a base for the robotic device or a robotic end effector for the robotic device is reduced.

* * * * *